: US008681947B2

(12) United States Patent
Beason et al.

(10) Patent No.: US 8,681,947 B2
(45) Date of Patent: *Mar. 25, 2014

(54) TELEPHONE EMERGENCY RESPONSE SYSTEMS AND METHODS

(75) Inventors: James T. Beason, Birmingham, AL (US); Benjamin V. Smith, Maylene, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/490,502

(22) Filed: Jun. 7, 2012

(65) Prior Publication Data

US 2012/0250677 A1 Oct. 4, 2012

Related U.S. Application Data

(63) Continuation of application No. 12/536,582, filed on Aug. 6, 2009, now Pat. No. 8,218,733, which is a continuation of application No. 11/229,142, filed on Sep. 16, 2005, now Pat. No. 7,590,223, which is a continuation of application No. 10/729,237, filed on Dec. 5, 2003, now Pat. No. 6,968,044.

(51) Int. Cl.
*H04M 11/00* (2006.01)

(52) U.S. Cl.
USPC .......................................................... 379/45

(58) Field of Classification Search
USPC ............. 379/37–51, 93.07, 90.01; 455/404.1, 455/404.2
See application file for complete search history.

(56) References Cited

U.S. PATENT DOCUMENTS

| 6,968,044 | B2 | 11/2005 | Beason et al. |
| 7,590,223 | B2 | 9/2009 | Beason et al. |
| 8,218,733 | B2 * | 7/2012 | Beason et al. ................ 379/45 |
| 2003/0186709 | A1 | 10/2003 | Rhodes et al. |
| 2004/0184584 | A1 | 9/2004 | McCalmont et al. |

FOREIGN PATENT DOCUMENTS

WO 03065750 8/2003

* cited by examiner

*Primary Examiner* — Stella Woo
(74) *Attorney, Agent, or Firm* — Cantor Colburn LLP

(57) ABSTRACT

An emergency system includes a gateway and a database in communication with the gateway. The database comprises first routing information for establishing a first communication link between a communication device and a controller, second routing information for establishing a second communication link between the gateway and the controller, wherein the second routing information is correlated to the first routing information; and location data associated with the communication device. Upon receiving identification information related to the communication device, the gateway retrieves the first routing information from the database and provides the first routing information to a switch. The gateway retrieves the second routing information from the database and uses the second routing information to establish a second communication link with the controller, and the gateway retrieves the location data from the database.

14 Claims, 5 Drawing Sheets

TELEPHONE EMERGENCY RESPONSE SYSTEMS AND METHODS

CROSS-REFERENCE TO RELATED APPLICATIONS

This application is a continuation of U.S. patent application Ser. No. 12/536,582, filed Aug. 6, 2009, the entire contents of which are incorporated here by reference, which is a continuation of Ser. No. 11/229,142 filed Sep. 16, 2005, now U.S. Pat. No. 7,590,223, the entire contents of which are incorporated herein by reference, which is a continuation of U.S. patent application Ser. No. 10/729,237 filed Dec. 5, 2003, now U.S. Pat. No. 6,968,044, the entire contents of which are incorporated herein by reference.

BACKGROUND

The number "911" is a universal emergency number for the entire United States. According to the National Emergency Number Association (NENA), in year 2000, approximately 150 million calls were made to the 911 emergency number. People born in the 1960s or later have grown up with 911 and have had enough exposure to the 911 emergency system that it has become second nature to them.

A standard emergency number such as 911 did not exist prior to 1968. The number 911, however, was not selected arbitrarily. Rather, it was selected because it is unique, short, and easy to remember. More importantly, the number 911 had never been designated for an office code, area code or service code so it was available for use as an exclusive, universal, emergency number. Once the number 911 was selected, a department was set up by the then Bell System to develop the infrastructure to support the 911 emergency number system.

Today in North America the number 911 is the universally dedicated emergency number for both wireline and wireless systems. Dialing 911 connects the caller with a Public Safety Answering Point (PSAP) attendant who then dispatches the appropriate emergency service depending on the nature of the emergency to the place where the call was placed. Emergency services include ambulance, police, fire, and/or rescue teams.

The first generation 911 emergency system was not, however, without problems. One being that the PSAP position attendant dealing with nearly hysterical people would sometimes be unable to receive all the information necessary for dispatching the appropriate emergency service. A piece of vital information that was often omitted by the caller was the location information. If the caller hung up before providing the location information, the PSAP attendant had no way of knowing who called and from where the call was made. Furthermore, without knowledge of the originating number there was the potential for a significant level of false emergencies.

SUMMARY

Embodiments of the invention include an emergency system, comprising a gateway and a database in communication with the gateway. The database comprises first routing information for establishing a first communication link between a communication device and a controller, second routing information for establishing a second communication link between the gateway and the controller, wherein the second routing information is correlated to the first routing information; and location data associated with the communication device. Upon receiving identification information related to the communication device, the gateway retrieves the first routing information from the database and provides the first routing information to a switch. The gateway retrieves the second routing information from the database and uses the second routing information to establish a second communication link with the controller, and the gateway retrieves the location data from the database.

Embodiments of the invention include a method of delivering first and second communications associated with an emergency call from a communication device. The method includes receiving identification information associated with a communication device at a gateway; retrieving, by the gateway, first routing information from a database for establishing a first communication link between the communication device and a controller; retrieving, by the gateway, second routing information from the database for establishing a second communication link between the gateway and the controller, wherein the second routing information is correlated to the first routing information; retrieving, by the gateway, location data associated with the communication device; and wherein information transmitted via the first communication link and the location data transmitted via the second communication link arrives at the controller at substantially the same time.

DESCRIPTION OF THE DRAWINGS

Embodiments of the present invention are described herein in conjunction with the following figures, wherein.

DESCRIPTION

Figure 1:
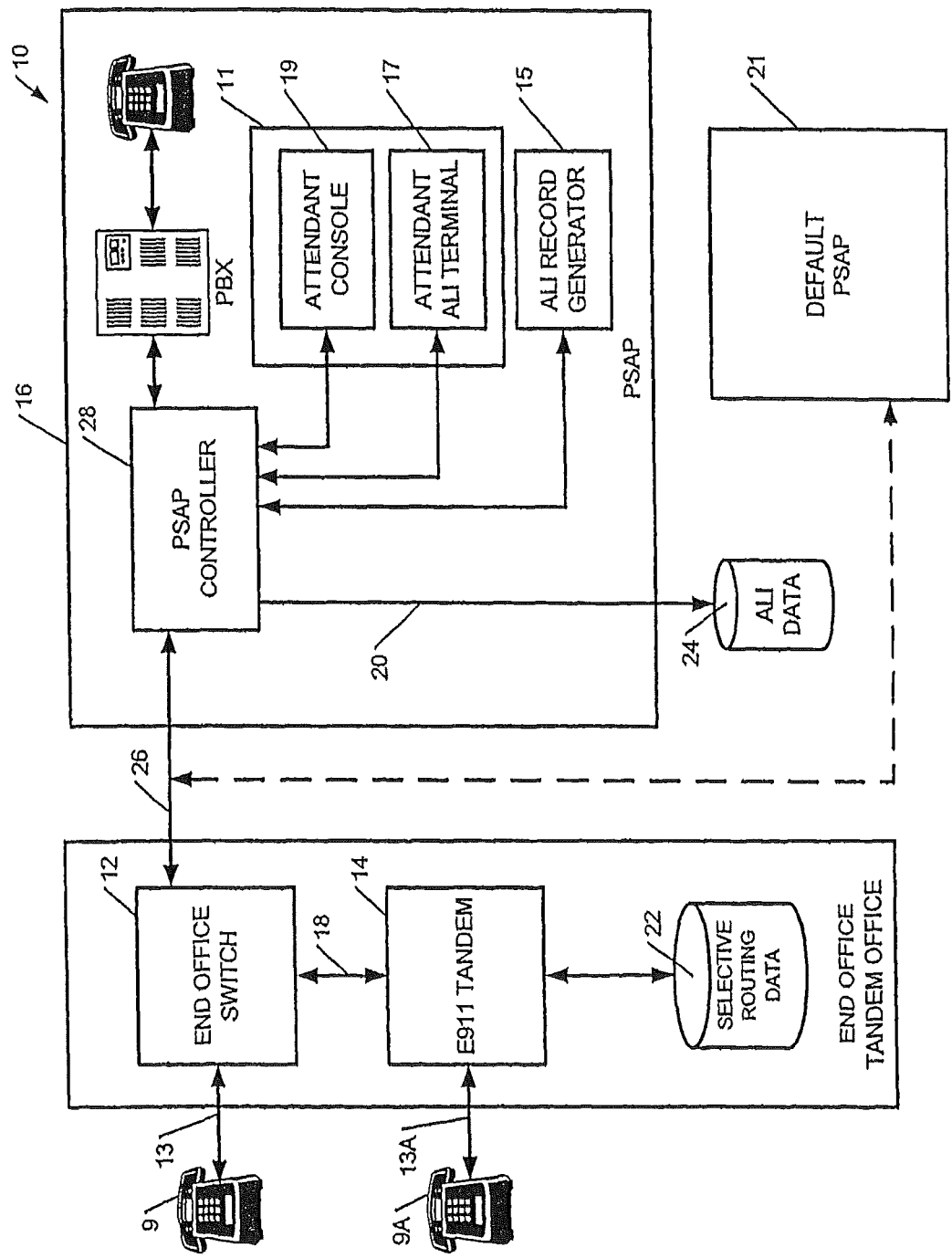
FIG. 1 is a schematic of the main hardware components of an E911 services architecture.

It is to be understood that the figures and descriptions of the present invention have been simplified to illustrate elements that are relevant for a clear understanding of the present invention, while eliminating, for purposes of clarity, other elements of a communications network. For example, operations support systems, equipment that provides inter-office facilities, miscellaneous network elements, etc. are not described herein. Those of ordinary skill in the art will recognize, however, that these and other elements may be found in a typical communications network.

Various embodiments of the present invention described herein are generally directed to providing an E911 services architecture and methodologies that consolidate at one location automatic number identification (ANI) call routing data, address location information (ALI) data, and coordinates/location data for wireless service. Accordingly, the E911 services architecture operates more efficiently than the conventional E911 architecture, improves the probability of handling an emergency call in a timely manner, and reduces the overall risk of an emergency services system failure. Various embodiments of the present invention also eliminate dedicated E911 trunking facilities, specialized E911 tandem switch functionality, disbursed selective routing databases at each of the E911 tandem switches, and the complexities associated with updating the selective routing databases and the ALI database across a distributed telecommunications network. In addition, embodiments of the present invention provide a more efficient and cost effective operation. Embodiments of the present invention further provide for simultaneous delivery, or substantially simultaneous delivery, of the emergency call, the calling party number, and the ALI data to the PSAP position attendant. As used herein, simultaneous delivery of the emergency call, the calling party number, and the ALI data to the PSAP comprises substantially simultaneous delivery via two separate communications links while taking into account normal network propagation delays.

In one general respect, an embodiment of the present invention is directed to a telephone emergency response system that displaces the E911 tandem switches, the disbursed routing databases located at the tandem switches, the conventional ALI database platforms, and the outdated methods for querying the databases and delivering emergency calls and call data to the PSAPs. The ANI routing database, the ALI database, and a coordinate/location database for wireless service may reside on an "integrated" signal transfer point (STP)/service control point (SCP) gateway, for example. The integrated STP/SCP gateway is an STP (the backbone platform of the Signaling System 7 (SS7) network) that includes embedded SCP functionality in addition to the classic STP functionality. In this embodiment the local switch from which an emergency call is made recognizes the call as an E911 call, and uses the telephone number of the caller obtained through the ANI capability of the local switch to launch an SS7 based query for routing instructions to the PSAP. The integrated STP/SCP gateway receives the query, forwards the query to the SCP side of the platform for the routing instructions, and returns the routing instructions to the switch of origin. Using functionality in accordance with one embodiment of the present invention, the integrated STP/SCP gateway simultaneously correlates the ANI with the caller's ALI data, and using TCP/IP links routes the ALI data to the PSAP to which the emergency call is being delivered. With coincident arrival at the PSAP of the emergency call from the switch of origin and the ALI data from the integrated STP/SCP gateway, the call and the ALI data may be simultaneously delivered to the PSAP position attendant answering the call.

According to another embodiment, the present invention is directed to a telephone emergency response system that includes the use of an Advanced Intelligent Network (AIN) Service Control Point (SCP) configured to provide routing instructions for the delivery of the emergency call to the appropriate PSAP based on the point of origin of the call and to provide the ALI data to the PSAP position attendant while the call is being delivered to the PSAP. Both the call routing database and the ALI database may reside on the AIN SCP and, therefore, may eliminate the need for the specialized routing functionality of an E911 tandem.

In accordance with one embodiment of the present invention, when a 911 emergency call is placed, the local switch launches a query to the "E911 SCP" using the SS7 protocol. The SCP responds to the switch with the routing instructions for delivering the call to the appropriate PSAP and correlates the ANI with the correct ALI data. The SCP also correlates the PSAP ten-digit number to a PSAP IP address and then delivers both the ALI and the ANI data to the PSAP via a TCP/IP data link, for example. This embodiment also may support Phase II requirements for wireless emergency calls through a third coordinate routing database for routing E911 calls dialed from a wireless device to the appropriate PSAP.

FIG. 1 is a schematic showing various hardware components of a baseline E911 services architecture 10. The services architecture 10 may include, for example, several systems or platforms and, for example, several capabilities or functionalities required for providing baseline E911 services. The systems or platforms may include local switches 12, E911 tandem switches 14, PSAP equipment 16, inter-office facilities for voice trunking and data links 20, a selective routing database 22, and an ALI database 24, for example. The capabilities or functionalities required include ANI routing functionality, E911 tandem functionality, selective call routing, ALI data retrieval, and call transfer, for example.

In operation, when a caller initiates an E911 call from a telephone 9 through a subscriber line 13, the local switch 12 determines where it should send the call based on the digits dialed. Then, the ANI functionality embedded in the local switch 12 identifies the calling party by their ten-digit telephone number and the local switch 12 routes the call over dedicated Multi Frequency (MF) trunks 18 to the E911 tandem switch 14. The local switch 12 passes the calling party's ten-digit ANI to the E911 tandem switch 14. The E911 tandem 14 includes functionality to recognize the call as an emergency call, and using the ten-digit ANI launches a query to the selective routing database 22, which may be integrated in the E911 tandem 14 or may be running on an a remote database engine depending upon the specific architectural implementation. In either case the selective routing database 22 is physically located at the E911 tandem 14 and the information contained therein may be used for routing the E911 call to the appropriate PSAP 16. Routing is determined using an Emergency Services Number (ESN), which is a three to five digit number used to represent an emergency service zone. The ESN is used for E911 call routing to and between PSAPs. The ESN is assigned to every NPA-NXX for the subscribers in a particular area who are provided with emergency services from a given E911 tandem 14. Those skilled in the art will appreciate that the E911 tandem 14 may receive the emergency call directly from a telephone 9A through a subscriber line 13A.

In the event of an ANI failure such as, for example: (1) an ANI failure at the local switch 12 from which the call originated; or (2) there is no ANI information in the selective routing database 22 (3) or there is no ESN assigned to the ANI, the E911 tandem 14 routes the call to a secondary or default PSAP 21. The default PSAP 21 is used in the event of an ANI failure because an emergency call cannot be routed to the appropriate PSAP without the proper ANI information that allows the E911 tandem 14 to conduct queries for the ALI and for the routing instructions. Without the ANI information there is no way to correlate the ALI information to the calling party. The default PSAP 21 thus provides a backup service so that a live attendant may process the emergency call and assist the caller.

When the ANI information is provided to the E911 tandem 14 and it is able to route the call to the primary PSAP 16, both the call and the ANI information are delivered to the PSAP 16 over trunks 26 connecting the E911 tandem 14 to the PSAP 16. A PSAP controller 28 then uses the ANI information to launch a query over dedicated 56 Kb data links 20 to the ALI database 24 to retrieve the ALI data associated with a ten-digit telephone number of the PSAP 16. The ALI data is contained in ALI database 24 and includes various pieces information related to the originating point of the emergency E911 call including, for example, the occupant name(s), phone number, street address, nearest cross-street, and any special pre-existing conditions (i.e., hazardous material). Once the ALI data is retrieved, the information is delivered to the PSAP position attendant 11 to which the call was delivered. The PSAP position attendant 11 is located at an attendant console 19 and uses the attendant ALI terminal 17 to view the ALI data and simultaneously communicates live with the caller via telephone over voice trunks. The ALI record generator 15 may be used to generate a hard copy of the ALI data on a printer. Based on the nature of the emergency and/or the planned dispatch of emergency services personnel, the PSAP position attendant 11 may use call transfer functionality of the AIN to transfer the call to a police station, a fire station, etc. to dispatch the appropriate personnel to handle the emergency.

In conventional E911 services, the ALI data is provided to the E911 PSAP attendant position 11 after the PSAP attendant position 11 receives both the call and the ANI information of the caller. This time lag exists because the PSAP controller 38 retrieves the ALI data from the ALI database 24 after it receives the ANI information from the E911 tandem 14. The time required to query and retrieve ALI data from the ALI database 24 will vary depending on the specific E911 service architecture 10 employed. For example, the ALI database 24 may or may not be collocated with the PSAP 16. If the ALI database 24 is located remotely from a service provider's data center, queries to the database 24 and data retrieved therefrom must traverse the 56 Kb data links 20, for example. Therefore, it will take longer for the ALI data to arrive at the PSAP attendant position 11 than if the ALI database 24 was collocated with the PSAP 16.

Various embodiments of the present invention may utilize the functionality of intelligent communications networks, such as for example, the AIN. The various embodiments of the present invention may communicate over such intelligent communications networks using a variety of signaling protocols, including, but not limited to, the SS7 protocol (e.g., TCAP), TCP/IP (e.g., LDAP), and other similar protocols. A brief introductory description of one AIN environment and the SS7 protocol and how they interact with a public switched telephone network (PSTN) is provided herein in conjunction with the description of FIG. 2 to garner a better understanding of the various embodiments of the present invention. Nevertheless, those skilled in the art will appreciate, that the present invention is not limited to an AIN environment and is not limited to communications utilizing the SS7 protocol capabilities. Rather, the present invention may be practiced in a variety of operating environments including networks and systems comprising packet-switches, servers, and modules capable of transmitting and receiving information in the form of packets between devices interconnected over any predetermined telecommunications network. Some examples of such operating environments include, but are not limited to, packet-switched environments, Voice over Internet Protocol (VoIP) environments, Ultrawideband environments, and the like.

Figure 2:
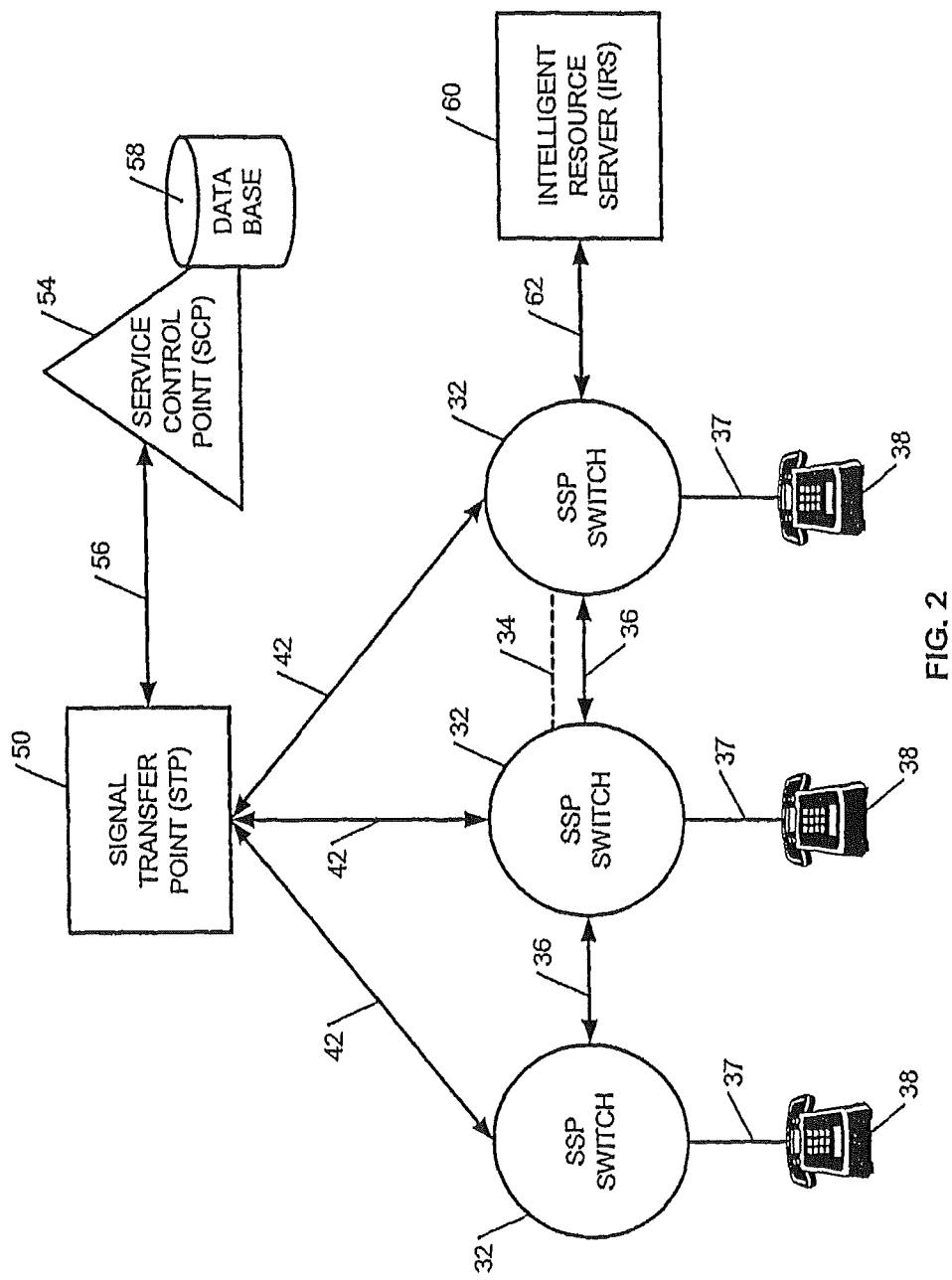
FIG. 2 is a block diagram of one embodiment of a Public Switched Telephone Network (PSTN) including an Advanced Intelligent Network (AIN) elements—Service Control Point (SCP)

FIG. 2 is a block diagram of an Advanced Intelligent Network (AIN) 30, which may be integrated with the PSTN and represents one of a variety of embodiments and environments in which the present invention may be practiced. AINs are generally utilized by Local Exchange Carriers (LECs) to allow the LECs to provide call processing features and services that are not embedded within conventional switching circuits of the PSTN. For an LEC comprising the AIN 30 illustrated in FIG. 2, the central office (CO) switches of the LEC may be provided as Service Switching Point (SSP) switches 32, which may be considered as AIN or SS7 enabled switches. The dashed line 34 between the SSP switches 32 indicates that the number of SSP switches 32 for a particular LEC may vary depending on the requirements of the AIN 30 for the LEC. Interconnecting the SSP switches 32 are data links 36, which may be, for example, trunk circuits.

Each SSP switch 32 has a number of subscriber lines 37 connected thereto. The subscriber lines 37 may be, for example, conventional twisted pair loop circuits connected between the telephone drop for the customer premises and the SSP switches 32 or trunk circuits, such as T-1 trunk circuits, interconnecting the customer premises and the SSP switches 32. Generally, the number of subscriber lines 37 connected to the SSP switch 32 is on the order of ten thousand to one hundred thousand lines. Each of the subscriber lines 37 is connected to a terminating piece of customer premises equipment, represented in FIG. 2 by telephones 38. Alternatively, the terminating piece of customer premises equipment may be, for example, a telecopier, a personal computer (PC), a modem, or a private branch exchange (PBX) switching system.

According to the AIN 30 illustrated in FIG. 2, each SSP switch 32 is connected to a signal transfer point (STP) 50 via links 42. The links 42 also may employ, for example, an SS7 switching protocol. The STP 50 may be a multi-port high speed packet switch that is programmed to respond to the routing information in the appropriate layer of the switching protocol and route the data packets to their intended destination.

The AIN 30 also may include an intelligent resource server (IRS) 60. The IRS 60 may be, for example, a service node such as a Compact Service Node (CSN) available from Lucent Technologies Inc., Murray Hill, N.J., although the IRS 60 may be any other AIN-compliant IRS such as, for example, an AIN/IP (Intelligent Peripheral) IRS from Nortel Networks Corp., Montreal, Quebec. The IRS 60 also may include voice and DTMF signal recognition devices and voice synthesis devices. The IRS 60 may be used primarily when some enhanced feature or service is needed that requires an audio connection to the call such as, for example, call return, or when transfer of a significant amount of data to a subscriber over a switched connection during or following a call. The IRS 60 may be connected to one or more of the SSP switches 32 via a data link 62, which may be, for example, an Integrated Service Digital Network (ISDN), Primary Rate Interface (PRI), Basic Rate Interface (BRI), a T-1 switching trunk circuit, and the like.

In order to keep the processing of data and calls as simple as possible at the switches, such as at the SSP switches 32, a set of triggers are defined at the SSP switches 32 for each call. A trigger in the AIN is an event associated with a particular subscriber line 37 that generates a data packet to be sent from the SSP switch 32 for the particular subscriber line 37 to, for example, the SCP 54 via the STP 50. The triggers may be an originating trigger for calls originating from the subscriber premises or terminating triggers for calls terminating at the subscriber premises. The trigger causes a message in the form of a query to be sent, for example, from the SSP switch 32 to the SCP 54. The SCP 54 in turn may interrogate the database 58 to determine whether some customized call feature or enhanced service should be implemented for the particular call based on the subscriber's call management profile stored in the database 58, or whether conventional dial-up telephone service should be provided. The results of the database inquiry are sent back from the SCP 54 to the SSP switch 32 via the STP 50. The query response message includes instructions to the SSP switch 32 as to how to process or route the call. The instructions may be to take some special action as result of a customized calling service or enhanced feature. For example, for a calling feature requiring the IRS 60 capabilities, the return instructions to the SSP switch 32 from the SCP

54 may be to route the call to the IRS 60. In addition, the return instructions from the SCP 54 may simply be an indication that there is no entry in the database 58 that indicates anything other than conventional telephone service should be provided for the call. The query message and response message may be formatted, for example, according to conventional SS7 TCAP (Transaction Capabilities Application Part) formats.

The AIN 30 illustrated in FIG. 2 may further include other network elements, which are not shown in FIG. 2 for purposes of clarity. In addition, the AIN 30 may include additional IRSs 60. Also, the AIN 30 may include one or more 5ESS Network Access Points (NAPs) in communication with the STP 50, which may be programmed to detect the trigger conditions, such as for example a Public Office Dialing Plan (PODP) customized feature for launching a 911 call.

Figure 3:
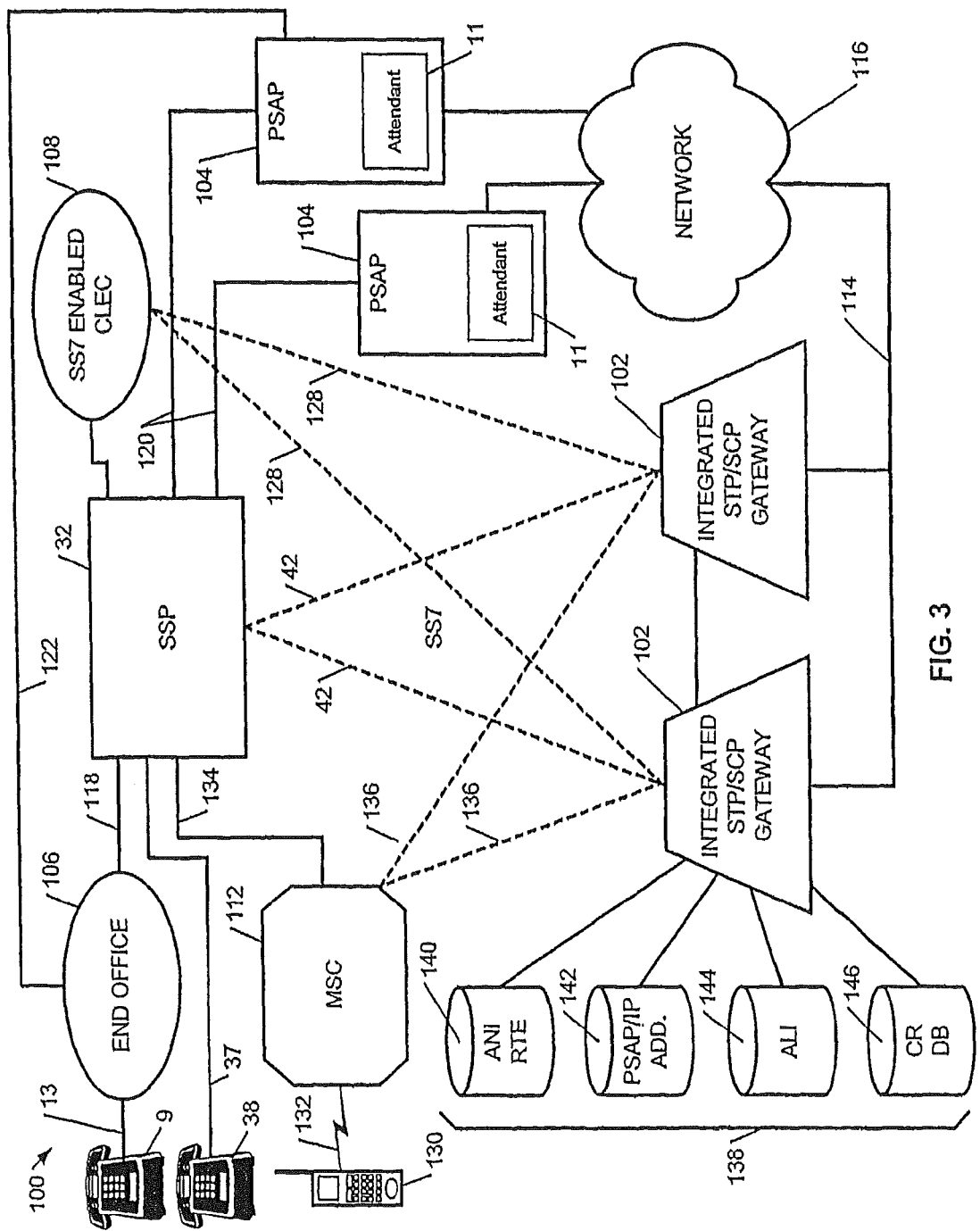
FIG. 3 is a block diagram of an E911 services architecture according to one embodiment of the present invention.

With reference now to FIG. 3, one embodiment of the present invention provides a system 100 for managing and routing E911 emergency calls to an appropriate PSAP position attendant 11. The system 100 may include one or more STP gateways. In one embodiment of the present invention, the STP gateways may comprise an integrated gateway having an STP/SCP gateway 102 pair. In other words, the STP 50 and the SCP 54, previously described with reference to FIG. 2, may be combined as a mated redundant integrated STP/SCP gateway 102 pair. The integrated STP/SCP gateway 102 interfaces with the PSAP 104 via a network 116 using a TCP/IP networking protocol link 114, for example. In one embodiment of the present invention, for example, each integrated STP/SCP gateway 102 may comprise one or more STP/SCP gateway 102 pairs, for example. The system 100 also may include an SSP 32 in communication with the integrated STP/SCP gateway 102, which interfaces with the PSAP 104 through the TCP/IP link 114, for example, and through trunk lines 120, for example.

Requests for routing instructions for an E911 emergency call are launched from the SSP 32 to the STP/SCP gateway 102 using the SS7 switching protocol via SS7 links 42. The ANI associated with the E911 emergency call is transferred to the STP/SCP gateway 102 from the SSP 32 over the SS7 links 42.

The STP/SCP gateway 102 also may include a database 138, which may comprise a plurality of databases residing at the integrated STP/SCP gateway 102. The system 100 also may include an end office 106 in communication with the PSAP 104 either directly or via the SSP 32. The system 100 also may include an SS7 enabled CLEC end office 108, for example. The STP/SCP pair 102 also may communicate with the PSAP 104 via the TCP/IP links 114 through the network 116. Furthermore, the system 100 may include a mobile switching center 112 (MSC) in communication with the PSAP 104 via the SSP 32. The MSC 112 is a switch for providing services and coordination between a wireless device 130 in a network and other external networks. The MSC 112 interfaces with the SSP 32 through trunk lines 134. An E911 emergency call from the wireless device 130 is routed from the SSP 32 to the appropriate PSAP 104 via trunk lines 120. The MSC 112 also may communicate with the STP/SCP gateway 102 via the SS7 links 136.

The network 116 may be, for example, any connected system of communication lines, channels, and radio interfaces, used to exchange information between two or more devices within the network 116. According to one embodiment of the present invention, the network 116 may include, for example, any packet switched network, an IP or ATM/FR (Asynchronous Transfer Mode/Frame Relay) network, a TCP/IP network, Internet or an intranet, a radio network, and any combinations thereof. In various embodiments of the present invention, the network 116 may include any networks and systems comprising packet-switches, servers, and modules capable of transmitting and receiving information in the form of packets over any predetermined telecommunications network. Examples of such networks and systems include, but are not limited to, packet-switched environments, VoIP environment, WiFi environments, Bluetooth environments, Ultrawideband environments, and the like.

In one embodiment of the present invention, the network 116 may be used to exchange information between the STP/SCP gateway 102 and the PSAP 104. According to one embodiment, the STP/SCP gateway 102 and the PSAP 104 may communicate via the network 116 using a TCP/IP based protocol. Furthermore, the network 116 may comprise a plurality of interconnected networks that enable or facilitate communication between the STP/SCP pair 102 and the PSAP 104.

Each of the various components comprising the system 100 and their interaction for managing the E911 emergency calls via the system 100 are now described. Accordingly, in one embodiment of the present invention, the system 100 may include the end office 106 for dialing to the SSP 32 and setting up a trunk between the subscriber telephone 9, 38 and the SSP 32. The end office 106 may comprise a central office switch to which the subscriber telephone 9 is connected via the subscriber line 13. Generally, the end office 106 may be the last central office in communication with the subscriber's telephone 9 equipment to establish a line-to-line, line-to-trunk, or trunk-to-line connection to the telephone 9 via the subscriber line 13. An E911 emergency call placed to the end office 106 from telephone 9 then may be routed via trunk lines 118 to the SSP 32. Once the appropriate PSAP 104 routing instructions associated with call's ANI are retrieved by the STP/SCP gateway 102 and are provided to the SSP 32, the call is routed to the appropriate PSAP 104. Trunk lines as used herein comprise any communication lines between any two switching systems in a telecommunications network such as, for example, the end office 106 and the SSP 32. An E911 emergency call received at the end office 106 also may be routed directly to the appropriate PSAP 104 via trunk line 122. As discussed previously with reference to FIG. 2, the subscriber telephone 38 may be connected directly to the SSP 32 via the subscriber line 37.

One embodiment of the present invention may include a CLEC end office 108, for example. The CLEC end office 108 competes for local exchange services, international communication services, Internet access, and entertainment. In some environments, a CLEC end office may buy or lease E911 services from a telecommunications service provider (such as a regional Bell operating company (RBOC)) or may be SS7 enabled. The CLEC 108 is SS7 enabled such that it is capable of and may launch its own SS7 based query via the SS7 links 128 to the STP/SCP gateway 102 when it recognizes an incoming E911 call. The CLEC 108 transmits the ANI information associated with the telephone number of the calling device to the STP/SCP gateway 102 along with query according to the SS7 protocol functionality. The STP/SCP gateway 102 then provides the appropriate PSAP 104 routing instructions to the CLEC 108.

In another embodiment of the present invention, E911 emergency calls may originate from a mobile, e.g., cellular, wireless device 130 via a wireless communication link 132. The wireless call is then placed to the MSC 112 via the wireless link 132. The MSC 112 then launches an E911 query via SS7 links 136 for the appropriate PSAP 104 routing instructions and completes the call via any available connecting trunks.

The system 100 also may include a database 138 comprising a plurality of databases residing at the integrated STP/SCP gateway 102. A first database 140 (e.g., ANI routing database) may include instructions for routing an incoming E911 call to the appropriate PSAP 104 based on the call's ANI information. The routing instructions may include, for example, the PSAP's 104 ten-digit telephone number. The SP 32, CLEC 108 and the MSC 112 transfer the ANI information using the SS 7 protocol to the STP/SCP gateway 102 during a query. As a result of the query, the call routing instructions are returned to the SSP 32 in a response message from the STP/SCP gateway 102 such that the SSP 32 may initiate a call set-up to establish a voice communications path between the calling device (e.g., telephones 9, 38 or wireless device 130) and the PSAP 104. The STP/SCP gateway 102 may use the ANI information to conduct additional database 138 queries.

A second database 142 may include a PSAP 104 ten-digit telephone number to IP address conversion table. The table may include, for example, a list of the ten-digit telephone numbers of all the PSAPs 104 distributed across the system 100 correlated to each individual PSAP's 106 IP address. After the STP/SCP gateway 102 obtains the ten-digit telephone number of the PSAP 104 based on the ANI information from the first database 140, the STP/SCP gateway 102 queries the second database 142 to obtain the PSAP's 104 IP address. The IP address is thus correlated to the PSAP's 104 ten-digit telephone number and may be used to route a TCP/IP message to the PSAP 104 via the TCP/IP link 114 over the network 116.

A third database 144 may be employed to contain the ALI data correlated to the ANI information. Once the appropriate PSAP's 104 IP address is obtained from the second database 142, the STP/SCP gateway 102 may retrieve the call's ALI data from the third database 144. The STP/SCP gateway 102 then transmits the ALI data to the PSAP 104 via the TCP/IP link 114 over the network 116 using the IP address obtained from the second database 142.

Yet a fourth coordinate routing database 146 may be employed to ascertain the physical geographical location of a caller when an incoming E911 emergency call originates from a wireless device 130. The coordinate routing database 146 correlates the caller's coordinates (e.g., latitude, longitude, and/or cell site identifier) and routes the E911 call to the appropriate PSAP 104.

A query requesting routing instructions for a specific E911 emergency call may be launched to the STP/SCP gateway 102 by any SS7 enabled switch using the SS7 protocol via the SS7 links 42, 128, 136. For example, the query may be launched by the SSP 32 via SS7 links 42, or it may be launched by the SS7 enabled CLEC 108 via SS7 links 128, or it may be launched by the MSC 112 via SS7 links 136. The query is sent to the STP/SCP gateway 102 before a voice path can be set-up between the caller and the PSAP 104. The ANI information associated with the E911 emergency call is provided to the STP/SCP gateway 102 along with the query request from the SS7 enabled switch (e.g., the SSP 32, the CLEC 108 or the MSC 112). Upon receiving the SS7 query with the ANI information the STP/SCP gateway 102 issues a response to the querying device that includes the appropriate call routing instructions in order to set up the voice path between the caller and the PSAP 104. The ANI information is then used by the STP/SCP gateway 102 in order to obtain the appropriate PSAP's 104 ten-digit telephone number and IP address, and the appropriate ALI data to transmit to the PSAP 104 via the TCP/IP link 114 over the network 116. Accordingly, the voice signal and the ALI data will arrive at the PSAP position attendant 11 substantially simultaneously.

One example of an E911 call transaction according to one embodiment of the present invention will now be described with respect to an E911 call dialed from the end office 106, for example. Accordingly, an E911 call is dialed from telephone 9. Before a voice path can be set-up between the telephone 9 and the PSAP 104, however, the SSP 32 recognizes the call as an E911 call and issues a query to the STP/SCP gateway 102 to obtain the appropriate PSAP 104 routing instructions for routing the call. The ANI information is provided to the STP/SCP gateway 102 by the SSP 32 as part of the information packet comprising the query sent to the STP/SCP gateway 102 via the SS7 protocol. The STP/SCP gateway 102 obtains the ANI information and uses it to query the first database 140 to obtain the PSAP's 104 ten-digit telephone number based on the specific ANI information associated with the incoming E911 query. The STP/SCP gateway 102 then queries the second database 142 to obtain the IP address of the appropriate PSAP 104. The IP address is correlated to the PSAP's 104 ten-digit telephone number. Once the STP/SCP gateway 102 obtains the PSAP's ten-digit telephone number, it retrieves the appropriate ALI data from the third database 144 and routes the ALI data to the appropriate PSAP 104 at the IP address via the TCP/IP link 114 over the network 116, for example.

The STP/SCP gateway 102 sends the routing instructions comprising the PSAP's 104 ten-digit telephone number from the first database 140 to the SSP 32 that launched the query in order to begin setting up the voice path from the caller (e.g., telephones 9, 38 or wireless device 130) to the PSAP 104. While the SSP 32 is processing the voice path set-up, the STP/SCP gateway 102 transmits the ALI data retrieved from the third database 144 to the PSAP 104 using the IP address retrieved from the second database 142. The ALI data is transmitted via the TCP/IP link 114 over the network 116, for example. Accordingly, it is possible for the ALI data and the E911 emergency voice call to arrive at the PSAP position attendant 11 at approximately (e.g., substantially simultaneously) the same time. This eliminates any lengthy delays associated with the conventional E911 services architecture wherein the ALI data must be retrieved by the PSAP controller 28 (See FIG. 1) after it receives the call and the ANI information.

In other embodiments of the present invention, the STP/SCP gateway 102 may include the coordinate routing database 146 for routing E911 calls dialed from wireless devices 130 to the appropriate PSAP 104. The voice path set-up and the transmission of the ALI data over the TCP/IP link 114 is the same as previously described. When the wireless device 130 dials 911 its coordinates (e.g., longitude, latitude, and/or cell identifier) may be transmitted along with the call. If these coordinates are within a range of coordinates mapped to the PSAP's 104 ten-digit telephone number, the coordinate routing database 146 routes the E911 call to the STP/SCP gateway 102 and to the appropriate PSAP 104.

Figure 4:
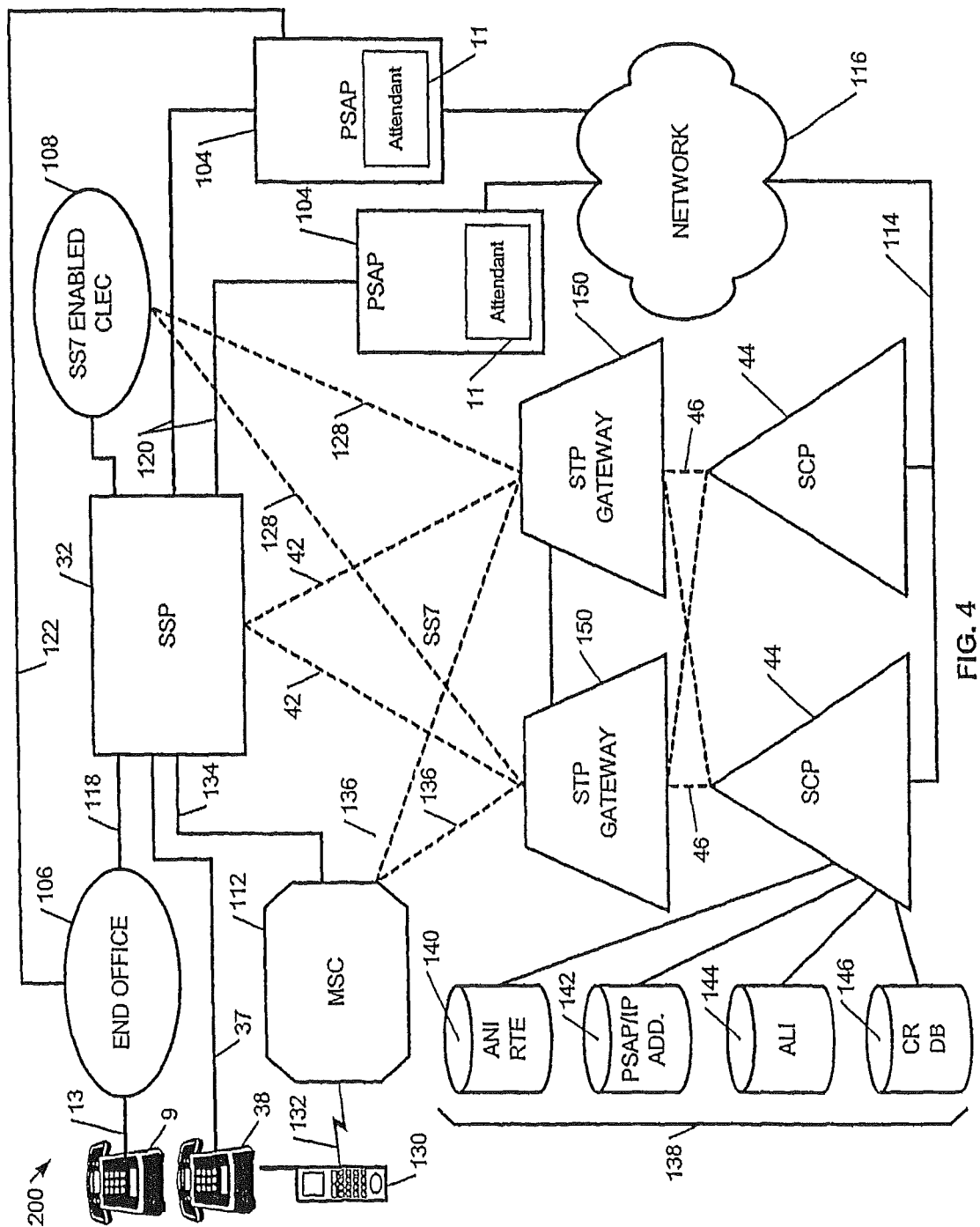
FIG. 4 is a block diagram of an E911 services architecture according to another embodiment of the present invention.

FIG. 4 is a diagram of a system 200 according to another embodiment of the present invention. The system includes the elements described above with respect to FIG. 3 except that the system 200 includes a remote SCP 54 in communication with an STP gateway 150 via the SS7 links 46 rather than an integrated STP/SCP gateway 102. Accordingly, in this embodiment the STP gateway 150 and the SCP 54 are located remotely from each other and communicate via the SS7 protocol links 46. Like the integrated STP/SCP gateway 102, the discrete SCP 54 may communicate with the appropriate PSAP 104 through the network 116 via the TCP/IP link 114, for example. In this embodiment of the present invention the SCP 54 contains the database 138, which may comprise the first, second, third, and fourth databases 140, 142, 144, 146 respectively.

As discussed previously with reference to FIG. 3, any AIN or SS7 enabled switch, such as the end office 106, the CLEC 108, and the MSC 112 may issue a query for the appropriate PSAP's 104 routing instructions whenever an emergency E911 call is dialed from the telephones 9, 38 or from the wireless device 130. The query is directed to the STP gateway 150, which in turn communicates with the SCP 54 to obtain the requested routing instructions. As discussed previously, the STP gateway 150 receives the ANI information as part of the SS7 query from the SS7 enabled switch. The STP gateway 150 provides the ANI to the SCP 54 so that the SCP 54 can query the database 138 for the appropriate PSAP's 104 ten-digit telephone number based on the ANI information. The ten-digit telephone number is mapped to the PSAP's 104 IP address. The ANI information is used to retrieve the ALI data which is then transmitted to the appropriate PSAP 104 using the IP address.

Once the SCP 54 receives the ANI information from the STP gateway 150, the SCP 54 queries the first database 140 and retrieves the PSAP's 104 ten digit telephone number based on the ANI information. Then the SCP 54 queries the second database 142 to obtain the PSAP's IP address that is correlated to the PSAP's 104 ten-digit telephone number. The SCP 54 obtains the PSAP's ten-digit telephone number, retrieves the appropriate ALI data from the third database 144, and routes the ALI data to the appropriate PSAP 104 using the IP address via the TCP/IP link 114 over the network 116.

After the SCP 54 retrieves the PSAP's 104 ten-digit telephone number from the first database 140, the associated routing instructions, comprising the PSAP's 104 ten-digit telephone number are returned to the STP gateway 150 and to the SSP 32 that initially launched the query via the SS7 links 42. Once the SSP 32 receives the routing instructions from the STP gateway 150 it may begin routing the PSAP's 104 ten-digit telephone number and begins to set-up the voice-path between the originating telephone 9, 38 or the wireless device 130 and the appropriate PSAP 104. As described previously with reference to FIG. 3, while the SSP 32 is setting up the voice path between the originating telephone 9, 38 or the wireless device 130 and the PSAP 104, the SCP 54 transmits the ALI data to the PSAP 104 using the IP address via the TCP/IP link 114 over the network 116. Accordingly, the ALI data and the E911 emergency call arrive at the PSAP position attendant 11 at approximately (e.g., substantially simultaneously) the same time, and thus eliminating any lengthy delays that may be associated with the conventional E911 services architecture.

The telecommunication service provider may maintain the database 138 comprising databases 140, 142, 144, 146 described herein in connection with FIGS. 3 and 4. The databases 140, 142, 144, 146 containing the relevant information, described previously, may be consolidated as a single database and may be located at one or several STP/SCP gateways 102 or at the SCP 54, depending on whether the particular embodiment employs the integrated STP/SCP gateway 102 or the remote SCP 54. Consolidation of the database 138 may reduce the total number of distributed databases that the telecommunication services provider has to maintain. Locating the database 138 at the STP/SCP gateway 102 or the SCP 54 allows the telecommunication services provider to use the SS7 switching protocol signaling network at a point in time when the telephone 9, 38, or wireless device 130 dials 911.

Figure 5:
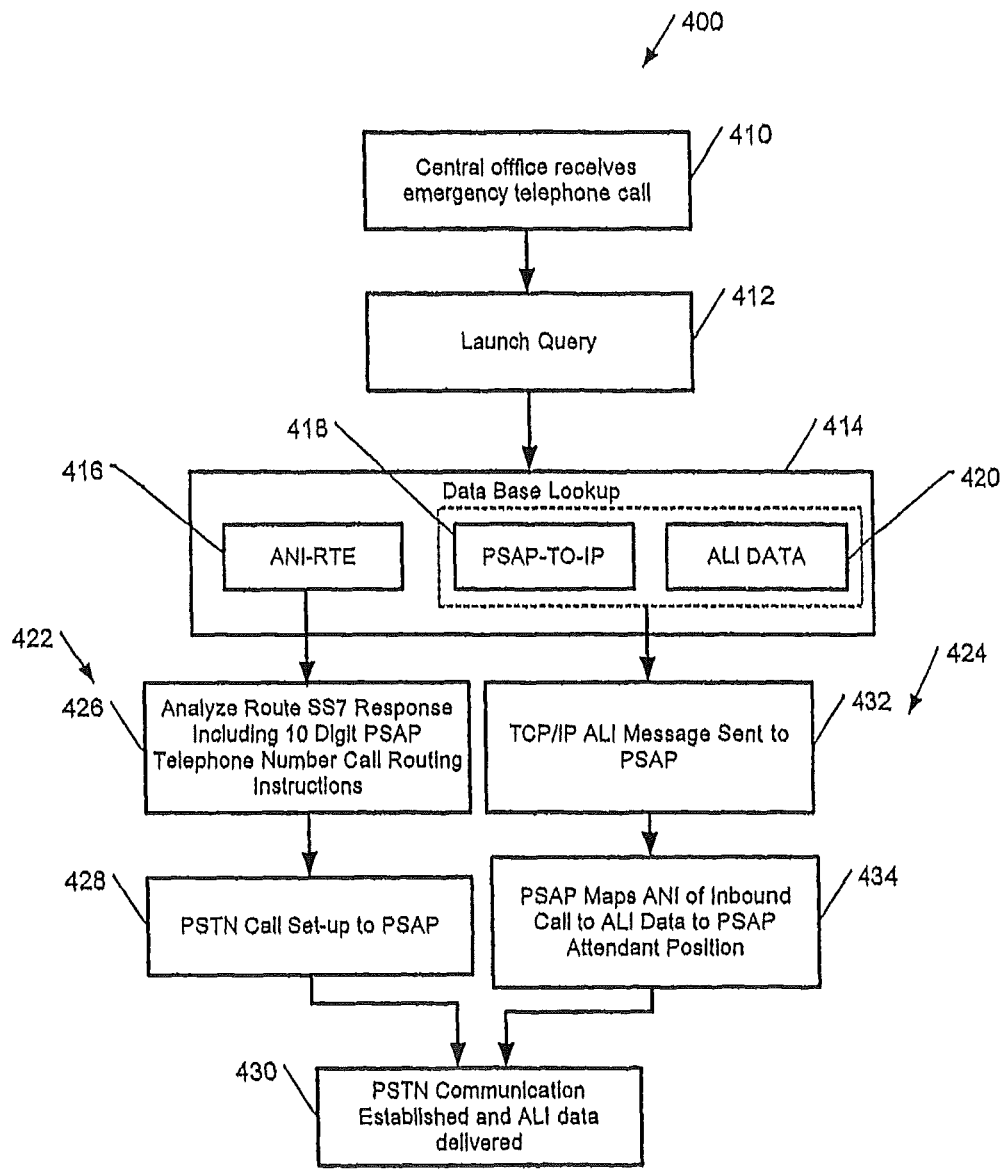
FIG. 5 is a process flow of an E911 call handling system according to one embodiment of the present invention.

FIG. 5 is a process flow 400 of an E911 call handling system using SS7, AIN functionalities and TCP/IP protocol links 114 according to the various embodiments of the present invention described with respect to the systems 100, 200 in FIGS. 3 and 4, respectively. Although the process flow 400 will be described with respect to the system 100 illustrated in FIG. 3, the process flow may be readily adaptable to the system 200 illustrated in FIG. 4. Accordingly, at block 410 a central office such as the end office 106, SS7 enabled CLEC 108, or MSC 112 recognizes a dialed E911 telephone call and launches a query to the SSP 32 switch. If the SS7 links are not present the query will be routed to an SS7 enabled switch and then a query will be launched. Those skilled in the art will appreciate that although the CLEC 108 includes SS7 functionality a CLEC may or may not include such functionality without departing from the scope of the invention. If the CLEC 108 is SS7 enabled, then it may launch its own E911 query. At block 412, any one of the switches such as the end office 106, the SS7 enabled CLEC 108 or the MSC 112 may directly (has SS7 links) or indirectly (does not have SS7 links) launch queries to the STP/SCP gateway pair 102 for routing instructions to set-up the voice path between the E911 emergency call originating device (e.g., telephones 9, 38 or wireless device 130, and the like) to the appropriate PSAP 104. At block 414, the STP/SCP gateway 102 receives the query via SS7 links 42. The SS7 query for the routing instructions comprises the originating calling device's ANI information. At block 416, the STP/SCP gateway 102 retrieves the PSAP's 104 ten-digit telephone number based on the ANI information from the first ANI RTE database 140. At block 418, the STP/SCP gateway 102 retrieves the PSAP's IP address that is correlated to the PSAP's ten-digit telephone number from the second database 142. At block 420, the STP/SCP gateway 102 retrieves the ALI data based on the ANI information from the third database 144. Those skilled in the art will appreciate that if the call had originated from the MSC 112 wireless switch, the STP/SCP 102 gateway receives the coordinates (e.g., latitude, longitude, and/or cell cite identifier) from the wireless device 130. The STP/SCP 102 then queries the fourth database 146 to determine the appropriate PSAP 104 to route the E911 calling party to based on the received coordinates.

Those skilled in the art will appreciate that process flow segments 422 and 424 will occur substantially simultaneously taking into account normal network propagation delays. Accordingly at block 426, the STP/SCP gateway 102 issues an SS7 response to the SSP 32, for example, and provides the switch with the appropriate PSAP 104 routing instructions comprising the PSAP's ten-digit telephone number. At block 428, the SSP 32 initiates call set-up processing to the PSAP 104. At block 430 a PSTN communication link is established between the originating calling device and the PSAP 104.

Substantially simultaneously with block 426, at block 432, after the PSAP routing instructions are delivered to the SSP 32 to initiate call set-up processing, the STP/SCP gateway 102 sends a TCP/IP message to the PSAP 104 via TCP/IP link 114 over the network 116. The message includes the ALI data based on the ANI information. At block 434, the PSAP 104 maps the ANI of the inbound call to the ALI data to the PSAP's 104 attendant position 11. The PSAP 104 attendant position 11 now has a voice communication link established with the party calling 911 and may view the ALI data associated with the ANI at the PSAP 104 attendant ALI terminal 17 and may now proceed to assist the caller with the emergency. Therefore, the voice path of the E911 emergency call and the ALI data associated with the ANI of the call arrive at the PSAP 104 at substantially the same time.

Although the present invention has been described with regard to certain embodiments, those of ordinary skill in the art will recognize that many modifications and variations of the present invention may be implemented. The foregoing description and the following claims are intended to cover all such modifications and variations. Furthermore, the components and processes disclosed are illustrative, but are not exhaustive. Other components and processes also may be used to make systems and methods embodying the present invention.

What is claimed is:

1. An emergency system, comprising:
a gateway;
a database in communication with the gateway, wherein the database comprises:
first routing information for establishing a first communication link between a communication device and a controller;
second routing information for establishing a second communication link between the gateway and the controller; and
location data associated with the communication device;
wherein upon receiving identification information related to the communication device, the gateway receives the first routing information for establishing the first communication link between the communication device and the controller, the gateway receives the second routing information and uses the second routing information to establish a second communication link with the controller, and the gateway receives the location data from the database;
wherein the first communication link to the controller is a voice telephone link;
wherein the second communication link to the controller is a packet data link.

2. The system of claim 1, wherein the voice telephone link comprises any one of a wireline and wireless voice telephone link.

3. The system of claim 1, wherein the packet data link is a TCP/IP link.

4. The system of claim 1, wherein the first communication link is established over a first network and the second communication link is established over a second network.

5. The system of claim 4, wherein the first network is a public switched telephone network.

6. The system of claim 4, wherein the second network is the Internet.

7. The system of claim 1, wherein the database further comprises information for determining the location coordinates of the communication device, wherein the communication device is a wireless communication device.

8. A method of delivering first and second communications associated with an emergency call from a communication device, comprising:
receiving identification information associated with a communication device at a gateway;
receiving first routing information from a database for establishing a first communication link between the communication device and a controller;
receiving second routing information from the database for establishing a second communication link between the gateway and the controller;
receiving location data associated with the communication device; and
wherein information transmitted via the first communication link and the location data transmitted via the second communication link arrives at the controller at substantially the same time;
wherein the first communication link to the controller is a voice telephone link;
wherein the second communication link comprises a packet data link.

9. The method of claim 8, wherein the voice telephone link comprises any one of a wireline and wireless voice telephone link.

10. The method of claim 8, wherein the packet data link further comprises a TCP/IP link.

11. The method of claim 8, wherein the first communication link is over a first network and the second communication link is over a second network.

12. The method of claim 11, wherein the first communication link is over a public switched telephone network.

13. The method of claim 11, wherein the second communication link is over the Internet.

14. The method of claim 8, further comprising retrieving location coordinates information for determining the location of the communication device, wherein the communication is a wireless communication device.

* * * * *